June 28, 1949.  E. M. OSTLUND ET AL  2,474,275
PULSE GENERATING SYSTEM
Filed Sept. 21, 1945

INVENTORS
EVERT M. OSTLUND
PAUL W. SOKOLOFF
BY
ATTORNEY

Patented June 28, 1949

2,474,275

UNITED STATES PATENT OFFICE 2,474,275

PULSE GENERATING SYSTEM

Evert Manuel Ostlund, Montclair, N. J., and Paul Walter Sokoloff, Forest Hills, N. Y., assignors to Federal Telephone and Radio Corporation, New York, N. Y., a corporation of Delaware Application September 21, 1945, Serial No. 617,876

10 Claims. (Cl. 171—97)

This invention relates to pulse generating systems and more particularly to the generation of high voltage pulses such as may be used, for example, in radar systems.

An object of the present invention is the provision of a system for generating high potential pulses from a relatively low voltage source of alternating current wherein the pulses bear a predetermined phase relation with respect to the source of alternating current.

Another object of the present invention is the provision of a relatively simple system of the type hereinabove described.

Figure 1:
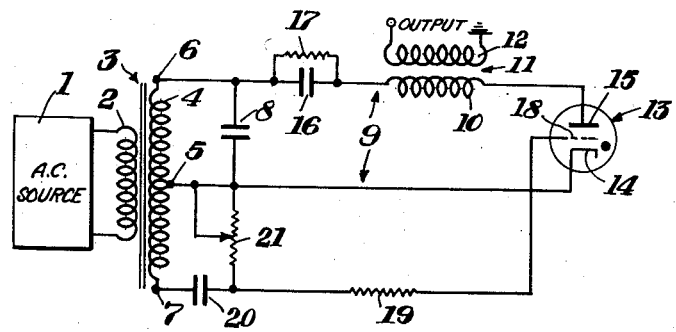
Figure 2:
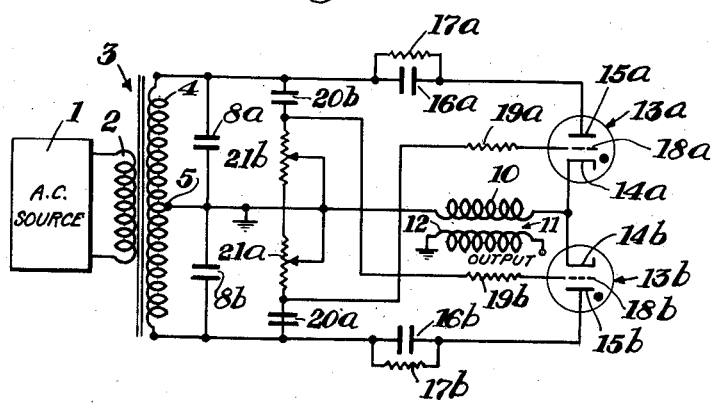

Other and further objects of the present invention will become apparent and the invention will be best understood from the following description of embodiments thereof, reference being had to the drawings, in which:

Fig. 1 is a schematic diagram of a pulse generating system embodying our invention; and Fig. 2 is a schematic driagram of another embodiment of our invention in which two pulses are produced for each cycle of energy from the alternating current source.

In the prior art, synchronization or timing of low-voltage pulses with respect to the alternating current source from which they are derived is provided for by a circuit including one tube. This circuit is then utilized to control a second circuit from which high voltage pulses are obtained. In accordance with our invention a circuit including only one tube is used both for synchronization or timing of pulses, and for obtaining high voltage pulses.

Referring now to Fig. 1, alternating current energy from a low voltage source 1 is applied to the primary 2, of a transformer 3 having a secondary 4 with a tap 5 intermediate the ends 6 and 7 thereof. A condenser 8 is connected across the part of the secondary 4 between end 6 and tap 5. Condenser 8 is alternately charged in opposite directions by the energy induced in this portion of the secondary. A discharge circuit 9 is provided for rapidly discharging condenser 8 at a predetermined point in the alternating current cycle of charging and recharging of said condenser. This discharge circuit 9 includes the primary 10 of a pulse step-up transformer 11 whose secondary 12 is connected to any suitable utilization device and provides high voltage pulses. The rapid discharge of condenser 8 is controlled preferably by means of a gaseous electron discharge device 13 whose cathode 14 is directly connected to one side of condenser 8 and whose anode 15 is connected in series with the primary 10 of pulse transformer 11 and a condenser 16 to the other side of condenser 8.

Tube 13 is ignited, by means described hereinafter, at a selected point of the cycle during which the side of condenser 8 connected to the cathode is negative. When tube 13 is ignited, condenser 8 discharges. Since the primary 10 of transformer 11 offers very little reactance to the D. C. current flowing therethrough, a large current would tend to flow through tube 13 and might damage it as well as the rest of the equipment. The condenser 16, however, while allowing a rapid build-up of current flow through the primary 10, definitely limits the amount of charge that can flow through, thereby protecting the tube 13 as well as the rest of the equipment, and at the same time serving to help make the trailing edge of the pulse generated in the secondary 12 quite short. A resistance 17 is provided across condenser 16 to allow the charge thereon to leak off.

The ignition of tube 13 is controlled by controlling the potentials applied to the grid 18 thereof. Tube 13 is preferably of the type in which a very small voltage on the grid has the same effect as a very large voltage on the plate, that is a ratio, for example, 1 to 100 or more. Grid 18 is connected through a current-limiting resistor 19 and a condenser 20 to end 7 of the secondary 4 of transformer 3. A variable resistor 21 is connected between condenser 20 and the tap 5 of the secondary 4, the resistor 21 and the condenser 20 serving as a phase-shifting network to shift the phase of energy applied to the grid 18 with respect to that applied to condenser 8 and consequently to the plate 15 of tube 13. By adjusting resistor 21, the point at which tube 13 is discharged is determined. Synchronization or timing is quite precise in the system hereinabove described and relatively independent of variations in the amplitude of the alternating current source since, as stated before, the tube employed has a large grid plate control ratio and it is the phase of the voltage on the grid which substantially wholly controls the ignition of the tube.

In the arrangement illustrated in Fig. 1, a pulse is produced for each complete cycle of energy from the A. C. source 1. By duplicating the arrangement shown in Fig. 1 in a push-pull system utilizing two gaseous tubes and two condensers in place of condenser 8, each arranged across the separate halves of the secondary 4 of transformer 3, two pulses can be obtained for each cycle of energy from the A. C. source 1.

Referring now to Fig. 2 in which parts corresponding in function to those illustrated in Fig. 1 are indicated by the same numeral, and where said parts have been duplicated by subscripts $a$ and $b$, it will be seen that the arrangement of Fig. 2 is similar to Fig. 1 except that the pulse transformer 11 is arranged in the cathode circuit, that is, between the cathodes 14$a$ and 14$b$ of tubes 13$a$ and 13$b$ and the tap 5 of the secondary of transformer 3. Condenser 16$a$ and 16$b$ correspond in their current-limiting function to condenser 16, and resistances 17a and 17b serve to discharge the condensers 16a and 16b. The ignition control or phase shift of tube 13a is provided by condenser 20a and variable resistor 21a, whereas the ignition control for tube 13b is provided for by condenser 20b and the variable resistor 21b.

While we have described above the principles of our invention in connection with specific apparatus, and particular modifications thereof, it is to be clearly understood that this description is made only by way of example and not as a limitation on the scope of our invention as defined in the accompanying claims.

We claim:

1. A system for generating high voltage pulses from a source of low voltage alternating current comprising a gas discharge tube having an anode, a cathode and a control electrode, a control circuit including said cathode and said control electrode, an output circuit including said cathode and said anode, a first impedance, means connecting one of said circuits across said first impedance, means for building up across said first impedance a voltage substantially in phase with that of said source, a second impedance, means connecting the other of said circuits across said second impedance, means for building up across said second impedance a voltage out of phase with that of said source, and means for deriving the said pulses from the current flowing in said output circuit.

2. The system according to claim 1 wherein said first impedance comprises a first condenser connected across at least part of a transformer secondary and wherein said second impedance comprises a resistor connected across at least part of a transformer secondary in series with a second condenser.

3. The system according to claim 2 wherein said output circuit is connected across said first condenser, further comprising means for limiting the current flowing in said output circuit upon the discharge of said first condenser.

4. The system according to claim 3 wherein said current limiting means comprises a condenser bridged by a resistor.

5. A system for generating high voltage pulses from a source of low voltage alternating current comprising a gas discharge tube having an anode, a cathode and a grid, an input transformer having a primary and a secondary, means connecting the substantial mid-point of said secondary to said cathode, a first condenser connected between said mid-point and one outer terminal of said secondary, means including the primary of an output transformer connecting said anode to said one terminal, a phase shifting network including a second condenser in series with a resistor connected between said mid-point and the other outer terminal of said secondary, means connecting the common terminal of said second condenser and said resistor to said grid, and means including the secondary of said output transformer for obtaining the said pulses from the output of said tube.

6. The system according to claim 5, wherein said output transformer is a step-up transformer and has its primary in series with a current limiting condenser, said condenser being bridged by a resistor.

7. A system for generating high voltage pulses from a source of low voltage alternating current comprising a pair of gas discharge tubes connected in push-pull, each having an anode, a cathode and a control electrode, two control circuits each including the control electrode and the cathode of a respective one of said tubes, a pair of first impedances connected in series, means connecting each of said control circuits across a respective one of said first impedances, two output circuits each including the anode and the cathode of a respective one of said tubes, a pair of second impedances connected in series, means connecting each of said output circuits across a respective one of said second impedances, means for building up across one of said pairs of series connected impedances a voltage substantially in phase with that of said source, means for building up across the other pair of series connected impedances a voltage out of phase with that of said source, and means for deriving the said pulses from the current flowing in said output circuits.

8. The system according to claim 7 wherein each of said second impedances comprises a condenser, further including means for limiting the current flowing in said output circuits upon the discharge of the respective condenser, said means comprising the parallel combination of a condenser and a resistor connected in each of said output circuits.

9. A system for generating high voltage pulses from a source of low voltage alternating current comprising a pair of gas discharge tubes each having an anode, a cathode and a grid, an input transformer having a primary and a secondary, a common conductor connecting the two cathodes to the mid-point of said secondary, a pair of first condensers connected in series across said secondary, a pair of anode leads each connecting one of the outer terminals of said secondary to a respective one of said anodes, a phase shifting network connected across said secondary including a pair of second condensers and a pair of resistors in series, with the two last-mentioned condensers connected to respective outer terminals of said secondary, means connecting the common terminal of each of said second condensers and its associated resistor to a respective one of said grids, means connecting a point on each of said resistors to said common conductor, and means for obtaining the said pulses from the output of said tubes.

10. The system according to claim 9 wherein said last means includes the primary of a step-up transformer connected in said common conductor, further comprising the parallel combination of a condenser and a resistor connected in each of said anode leads for limiting the current flowing through said tubes upon the discharge of the respective first condenser.

EVERT MANUEL OSTLUND.
PAUL WALTER SOKOLOFF.

REFERENCES CITED

The following references are of record in the file of this patent:

UNITED STATES PATENTS

| Number | Name | Date |
|---|---|---|
| 1,935,464 | Willis | Nov. 14, 1933 |
| 2,008,730 | Smede | July 23, 1935 |
| 2,235,385 | Rava | Mar. 18, 1941 |
| 2,287,542 | Vang | June 23, 1942 |
| 2,331,317 | Germeshausen | Oct. 12, 1943 |

FOREIGN PATENTS

| Number | Country | Date |
|---|---|---|
| 488,842 | Great Britain | July 14, 1938 |